(12) United States Patent
Grover et al.

(10) Patent No.: US 6,601,468 B2
(45) Date of Patent: Aug. 5, 2003

(54) DRIVE SYSTEM FOR MULTIPLE AXIS ROBOT ARM

(75) Inventors: Gaylen Grover, Copertino, CA (US); Dennis Wightman, Copertino, CA (US); Tomas Melendez, San Jose, CA (US)

(73) Assignee: Innovative Robotic Solutions, Santa Clara, CA (US)

( * ) Notice: Subject to any disclaimer, the term of this patent is extended or adjusted under 35 U.S.C. 154(b) by 0 days.

(21) Appl. No.: 10/032,400

(22) Filed: Oct. 19, 2001

(65) Prior Publication Data

US 2002/0078778 A1 Jun. 27, 2002

Related U.S. Application Data

(60) Provisional application No. 60/243,108, filed on Oct. 24, 2000.

(51) Int. Cl.[7] .................................................. B25J 18/04
(52) U.S. Cl. ............................... 74/490.03; 74/490.05; 414/744.5; 901/15
(58) Field of Search ......................... 74/490.01, 490.03, 74/490.05; 414/744.1, 744.3, 744.5; 901/15, 21, 23, 24

(56) References Cited

U.S. PATENT DOCUMENTS

| | | | |
|---|---|---|---|
| 4,693,666 A | | 9/1987 | Garin ........................ 414/744 |
| 4,813,846 A | * | 3/1989 | Helms ..................... 414/744.1 |
| 4,829,840 A | * | 5/1989 | Torii et al. ............... 74/490.03 |
| 4,897,015 A | * | 1/1990 | Abbe et al. .............. 414/744.8 |
| 4,947,702 A | | 8/1990 | Kato ........................... 74/479 |
| 5,007,784 A | * | 4/1991 | Genov et al. ............ 414/744.6 |
| 5,064,340 A | * | 11/1991 | Genov et al. ............ 414/744.5 |
| 5,314,293 A | * | 5/1994 | Carlisle et al. .......... 414/744.5 |
| 5,587,637 A | * | 12/1996 | Ohyama ................. 318/568.11 |
| 5,733,096 A | * | 3/1998 | Van Doren et al. ...... 414/744.3 |
| 5,741,113 A | * | 4/1998 | Bacchi et al. ............ 414/744.5 |
| 5,794,487 A | * | 8/1998 | Solomon et al. ........... 220/86.2 |
| 5,839,322 A | | 11/1998 | Genov et al. ................. 74/490 |
| 5,881,603 A | * | 3/1999 | Kitamura ................. 74/490.03 |
| 5,993,142 A | | 11/1999 | Genov et al. ................ 414/744 |
| 6,059,516 A | * | 5/2000 | Genov et al. ............ 414/744.5 |
| 6,062,099 A | * | 5/2000 | Suwa et al. .............. 74/490.01 |
| 6,105,454 A | * | 8/2000 | Bacchi et al. ............ 74/490.03 |
| 6,324,934 B1 | * | 12/2001 | Monaghan ............... 74/490.04 |

FOREIGN PATENT DOCUMENTS

JP     WO0021721     4/2000

OTHER PUBLICATIONS

PCT International Search Report, PCT/US01/50741, Oct. 23, 2001, 8 Pages.

\* cited by examiner

*Primary Examiner*—David A. Bucci
*Assistant Examiner*—Julie K. Smith

(57) ABSTRACT

A robot drive assembly for moving a working tool in x, y, z and theta directions comprising three independent, coaxially nested tubes, each tube being driven around a common central axis by drive belts attached to separate drive motors located in a mounting flange associated with the outermost tube. The motors, and the tubes which they drive, provide horizontal rotary motion to a robot arm attached to the upper end of the outer tube and the wrist and elbow of that arm. A fourth motor controls vertical motion of the whole assembly. The robot system also includes motor position adjustment structure and belt tension structure designed for ease of use and to eliminate movement of tensioned components once locked in position.

8 Claims, 13 Drawing Sheets

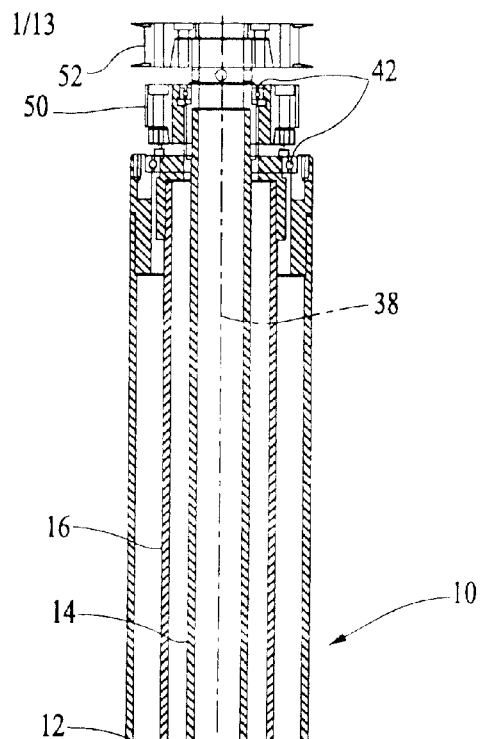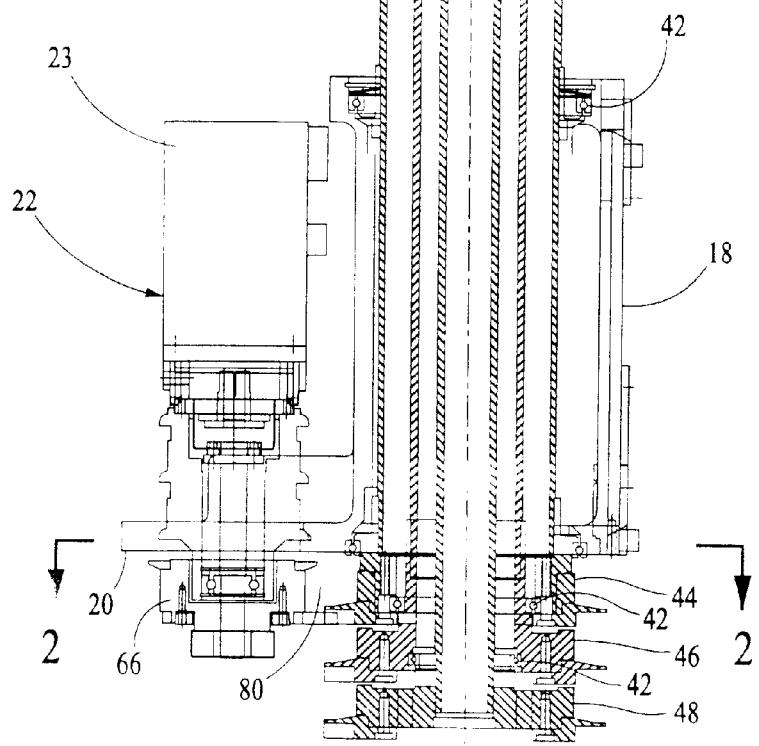
FIG. 1

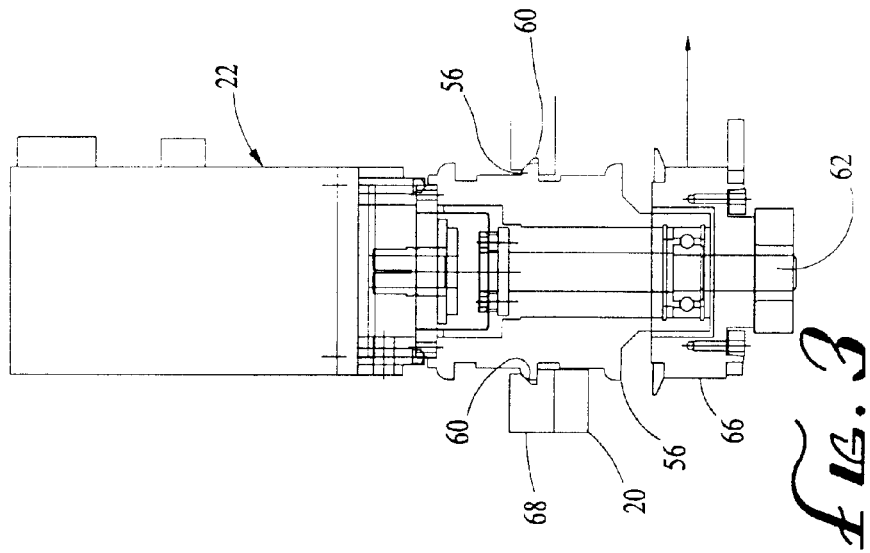
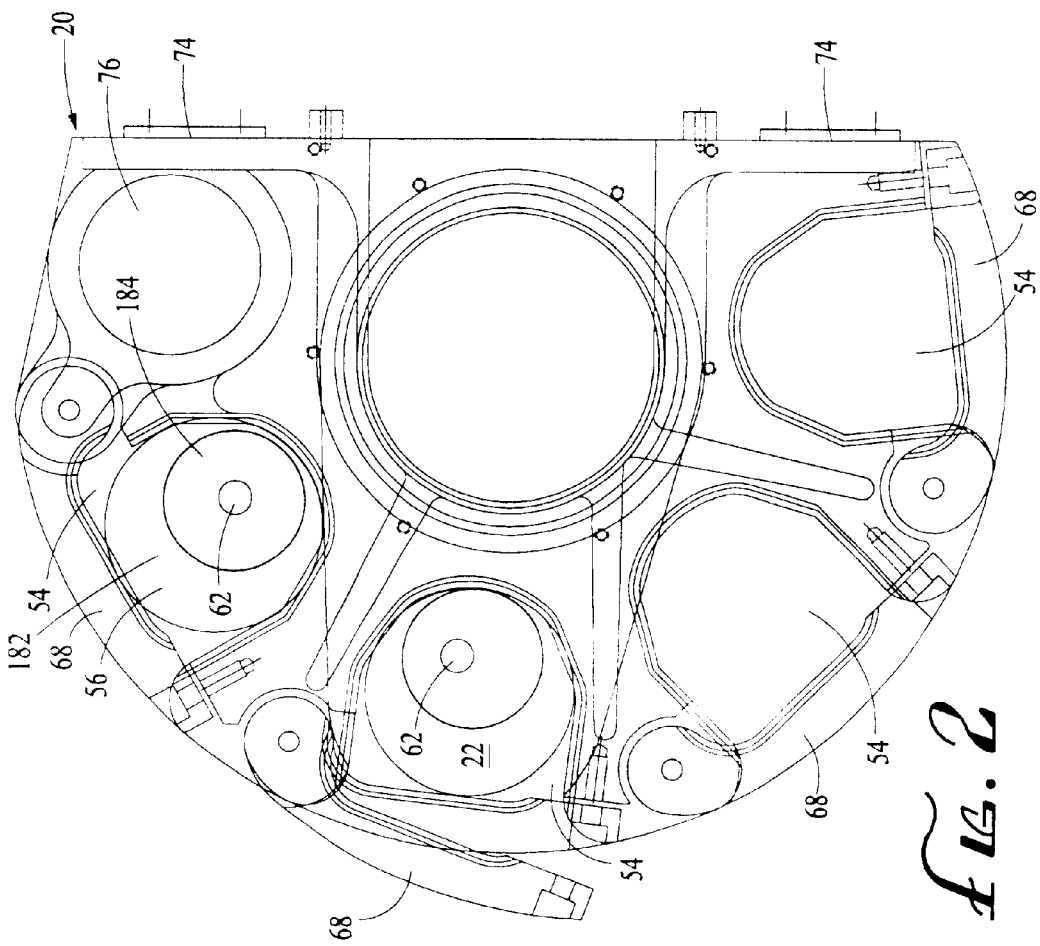

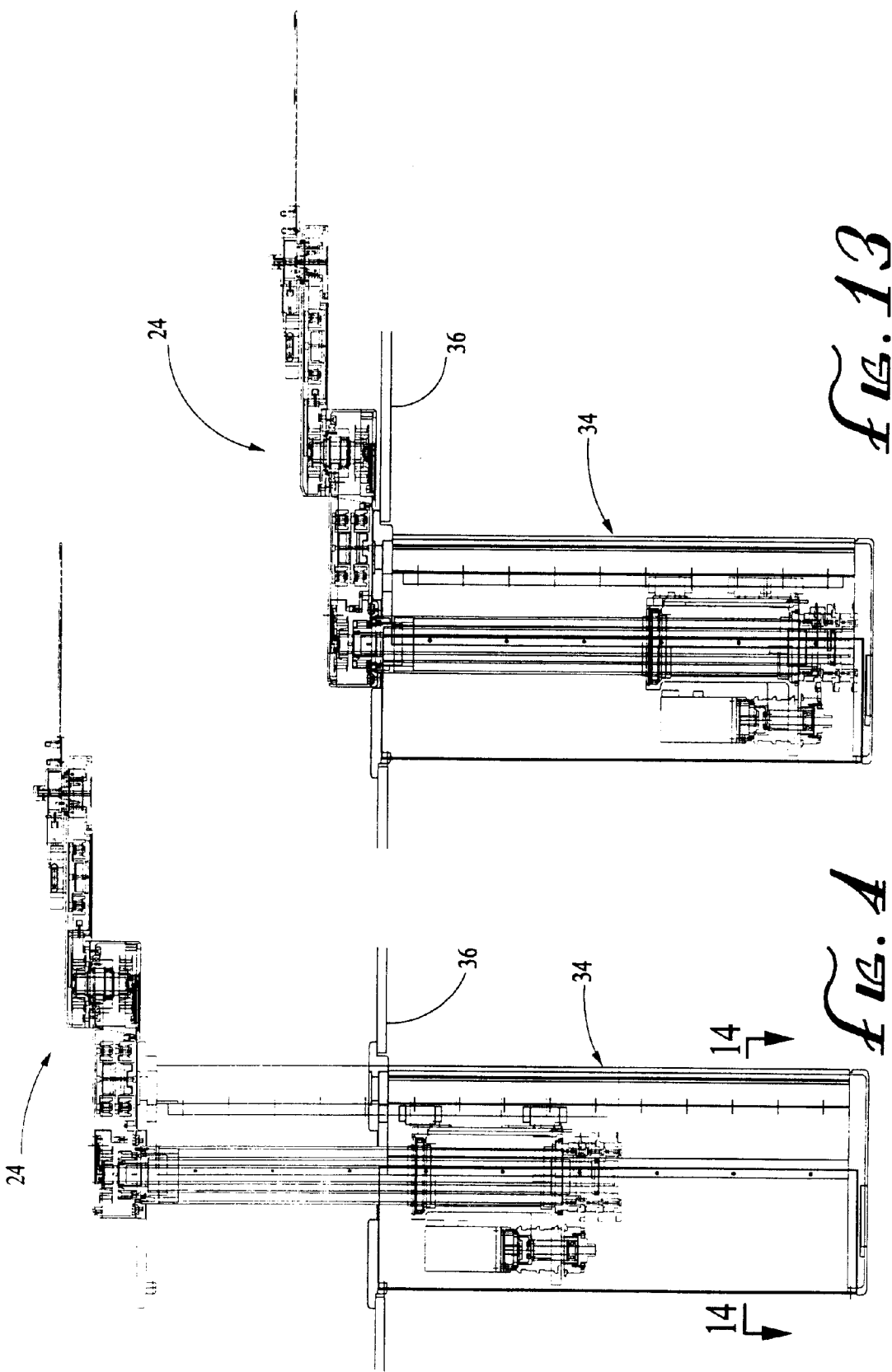

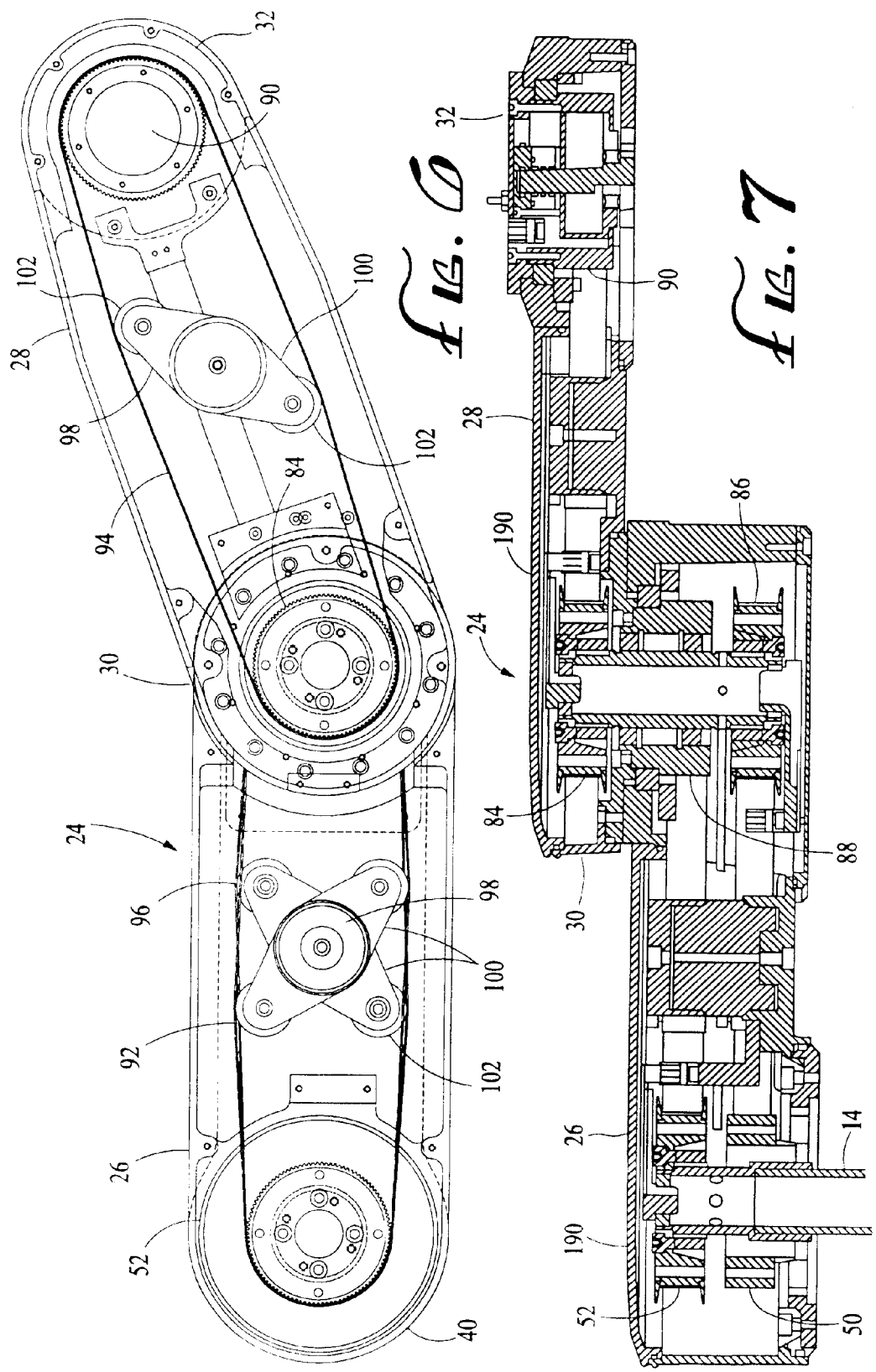

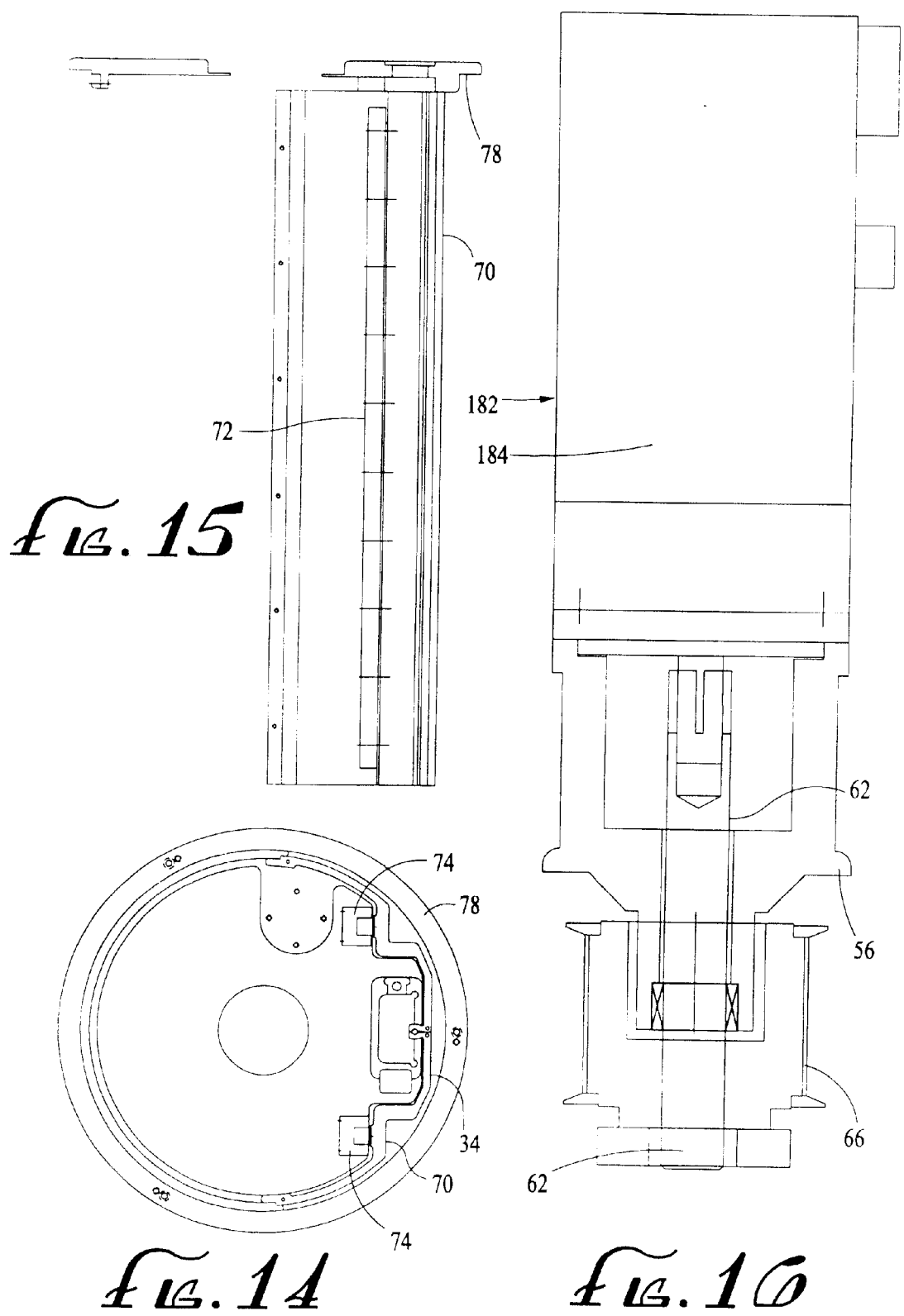

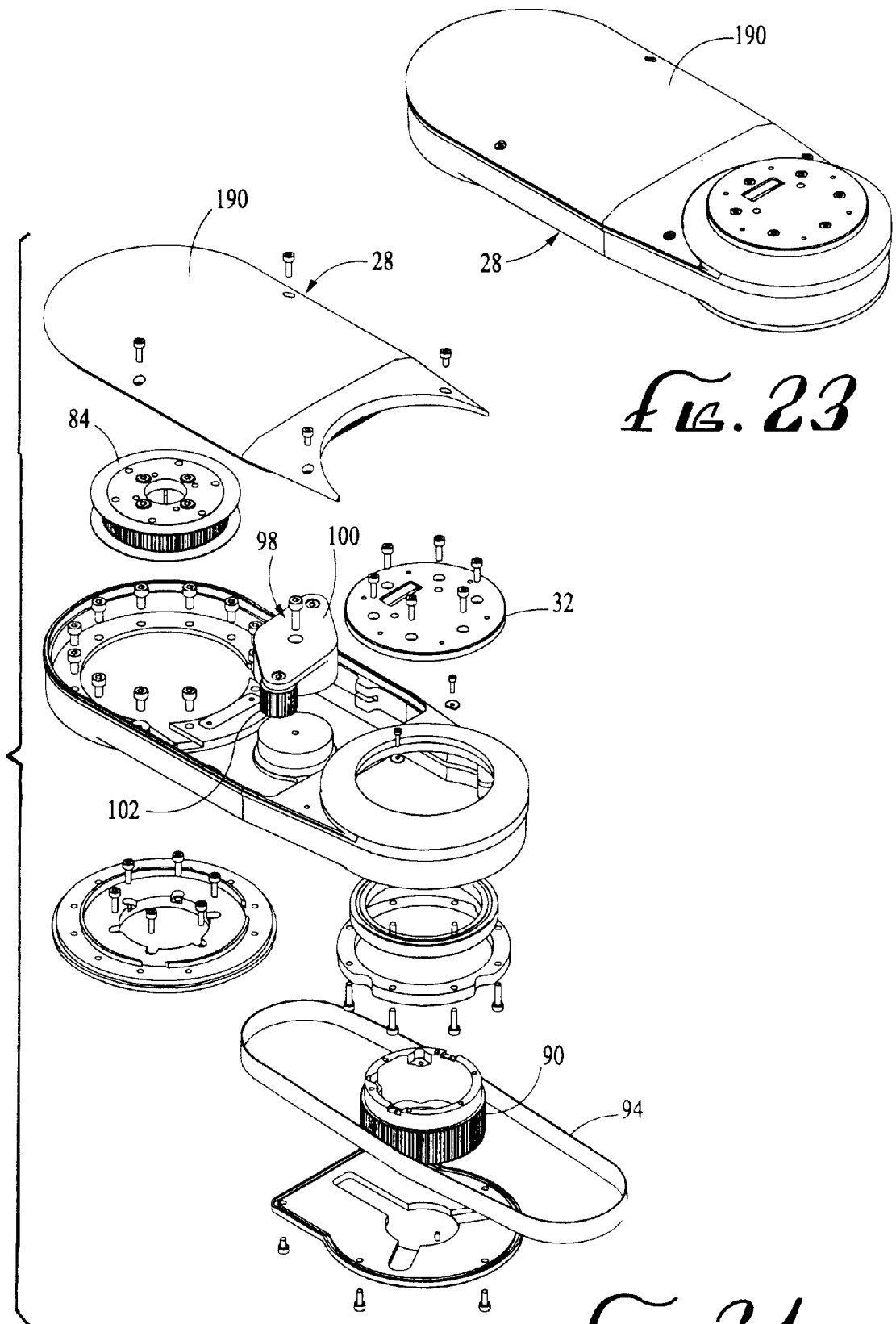

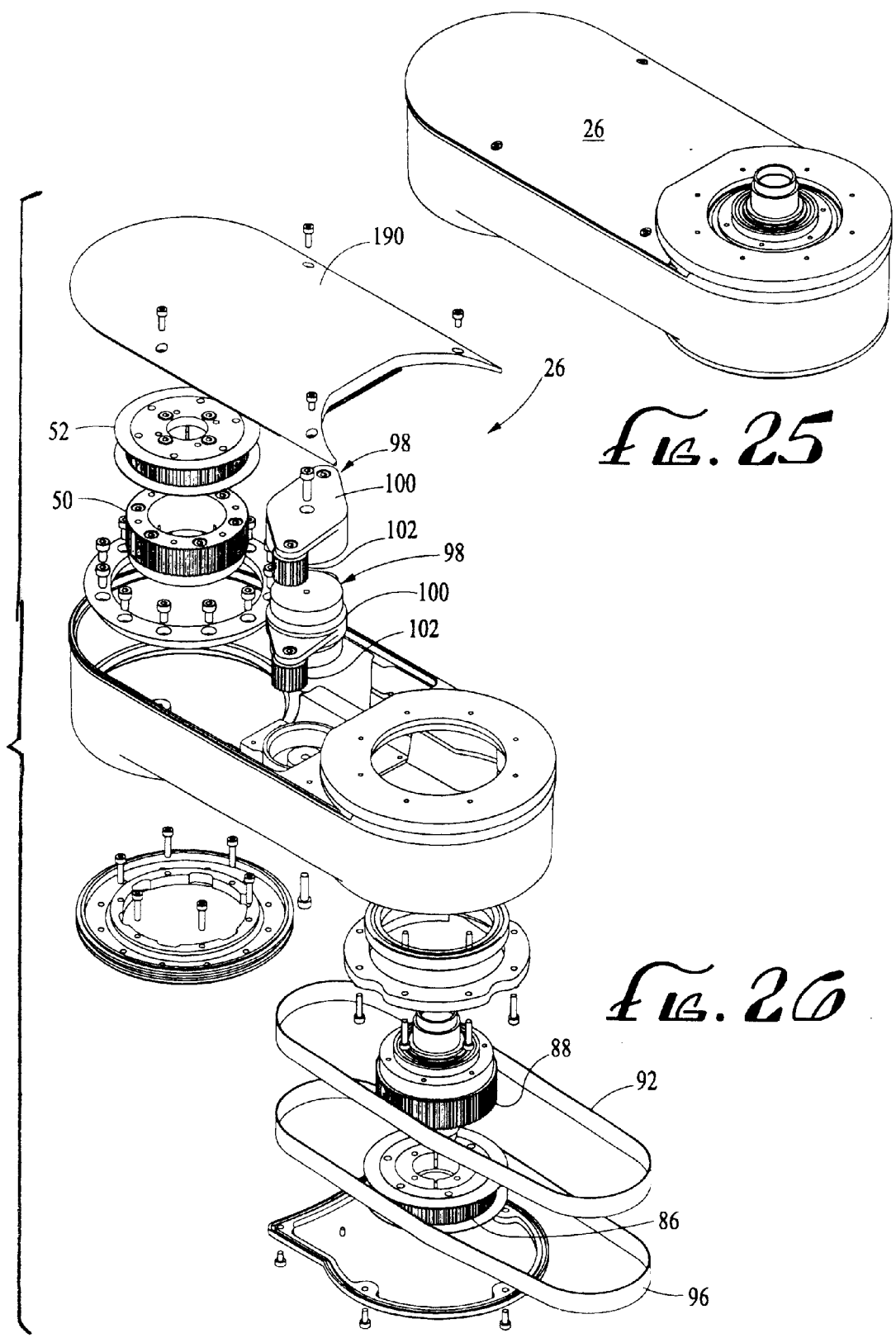

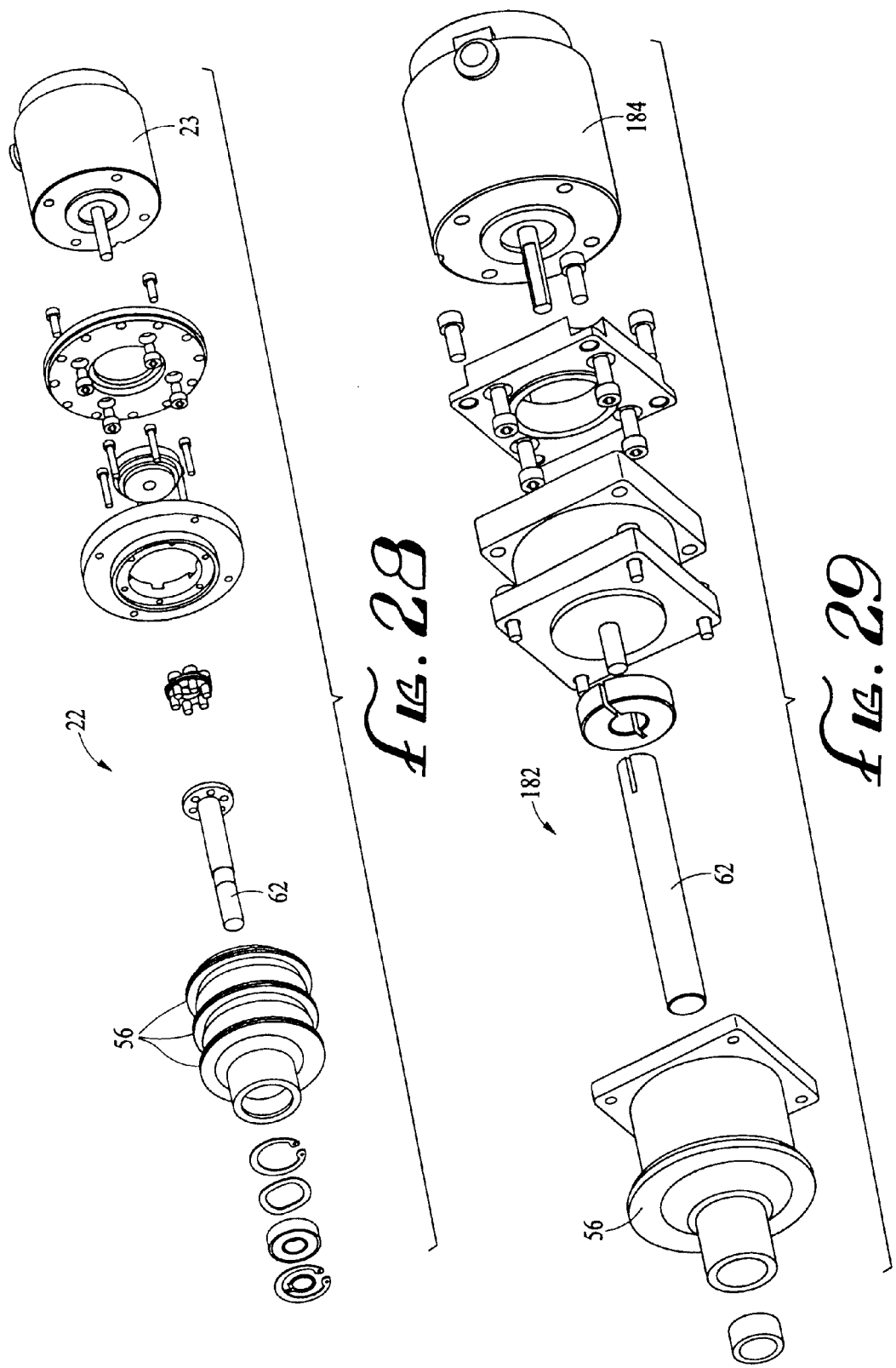

DRIVE SYSTEM FOR MULTIPLE AXIS ROBOT ARM

This application is based on and claims benefit from Provisional patent application Ser. No. 60/243,108 filed Oct. 24, 2000.

The present invention relates to robot arm drive systems, particularly systems for handling wafers in the semiconductor manufacturing industry.

BACKGROUND

Current robot arm systems include drive systems for independently controlling the extension of the arm, rotation of the arm, rotation of the grasping tool on the end of the arm and other movements in various different angular directions as are necessary to provide the necessary flexibility to perform numerous different maneuvers on, and manipulations of, items held by the robot hand. Certain robot systems also include telescoping mechanisms to extend the arm or to elevate the arm and related assemblies. Typically the operative end of the arm is equipped with an end effector or mechanical hand for holding or grasping an item such as a silicon wafer, computer hard disc, compact disk or other flat, touch sensitive product. The most common end effector uses one or more vacuum outlets which contact the surface of the wafer. However, more recently edge gripping systems are coming into use.

U.S. Pat. No. 4,897,015 to Abbe et al. describes a rotary-to-linear motion robot arm that uses a first motor to control a multi-linkage robot arm to produce straight line radial motion from motor-driven rotary motion. An additional motor may be coupled to the robot arm for operation independent of that of the first motor to angularly move the multi-linkage robot arm without radial motion. Because they independently produce radial motion and angular motion, the first and second motors produce useful robot arm movement when either one of them is operating. The robot arm of the Abbe et al. patent extends and retracts an end effector (or a hand) along a straight line path by means of a mechanism that pivotally couples in a fixed relationship a first arm portion (or aft arm) and a second arm portion (or forearm) so that they move in predetermined directions in response to rotation of the aft arm. To achieve angular displacement of the hand, a theta. drive motor rotates the entire robot arm structure.

U.S. Pat. No. 5,007,784 to Genov et al. describes a robot arm with an end effector structure that has two oppositely extending hands, each of which is capable of picking up and transporting a specimen. The end effector structure has a central portion that is centrally pivotally mounted about the distal end of a second link or forearm.

The robot arm structures of the Abbe et al. and Genov et al. patents operate similarly, in that each of the end effector structures picks up and transports specimens by using one motor to extend and retract a hand and another, different motor, to rotate the entire robot arm structure, to allow the hand to extend and retract at different ones of a restricted number of angular positions.

U.S. Pat. No. 5,741,113 to Bacchi et al is directed to a multiple link robot arm mechanism that uses two motors capable of synchronized operation to permit movement of the robot arm hand along a curvilinear path as the extension of the hand changes. A first motor rotates a forearm about an elbow axis that extends through distal and proximal ends of the aftarm and forearm arm respectively, and a second motor rotates the aftarm about a shoulder axis that extends through a proximal end of the aftarm. A mechanical linkage couples the aftarm and the forearm. The mechanical linkage forms an active drive link and a passive drive link. The active drive link operatively connects the first motor and the forearm to cause the forearm to rotate about the elbow axis in response to the first motor. The passive drive link operatively connects the forearm and the hand to cause the hand to rotate about a wrist axis in response to rotation of the forearm about the elbow axis. The wrist axis extends through distal and proximal ends of the forearm and hand, respectively.

Two major problems exist with currently available robots. First, robots with motors below the base plate perform only highly restricted radial, angular moves. Secondly, robots capable of X, Y, Z and Theta movement carry the drive motors above the base mounting flange and at the arm joints, resulting in a unit with a high inertia and sluggish response as well as a tendency to wear and, as a result, generate particles in the vicinity of the arm.

SUMMARY OF THE INVENTION

The current invention provides an arrangement, which allows completely independent movement of each arm element and also keeps all of the drive motors below the base plate of the system. This provides a much cleaner, streamlined arrangement, which is better balanced, and provides for a much more structurally rigid assembly. The new motor mounting arrangement allows for easy tensioning of drive belts as well as easy and rapid replacement of drive motors or belts if they should happen to malfunction.

The design incorporates multiple concentric spindles with a common central axis, all of the spindles being mounted on a single frame. Each spindle is separately driven and each controls a different linkage or arm portion. Because of this concentric assembly the drive assembly is easier to assemble, requires fewer parts and costs less to build, has a lower inertia, wear is reduced, the operation of the robot is quieter and it responds more quickly to signals from the electronic control unit.

Another unique aspect of the invention is the mechanical arrangement, which provides a multi-turn rotational hard stop for each of the nested spindles.

A still further aspect of the invention is a belt tensioning mechanism in the arm which delivers symmetrical outward forces on the belts eliminating creep of drive belts seen in prior art systems.

BRIEF DESCRIPTION OF THE DRAWINGS

FIG. 1 is a cutaway side view of spindle and drive assembly showing a single motor drive.

FIG. 2 is an enlarged top view taken along line 2—2 of FIG. 1 showing the drive frame with motor mounting cleats (without motor).

FIG. 3 is a front view showing a single motor drive set between the frame and a cleat.

FIG. 4 a partially cutaway view of the fully assembled system showing the assembly of FIG. 1 in its full-up position, mounted to a table top and enclosed in a half-shell frame.

FIG. 6 is a top view of the robot arm with the arm top cover removed, showing the pulley and drive system within the robot arm.

FIG. 7 is a side cutaway view of FIG. 6 showing the pulley and drive system within the robot arm.

FIG. 13 is a cutaway view of the fully assembled system of FIG. 4 with the assembly in its full down position.

FIG. 14 is a cross sectional view of the half shell assembly taken along line 14—14 of FIG. 4.

FIG. 15 shows the rail assembly that is mounted in the half shell frame.

FIG. 16 is a front view showing the Z-lift motor with pulley.

FIGS. 23 and 24 are top perspective views, assembled and expanded, respectively, of the forearm.

FIGS. 25 and 26 are top perspective views, assembled and expanded, respectively, of the aftarm.

FIGS. 28 and 29 are expanded perspective side views of the motor gear head and lift motor assembly, respectively.

DETAILED DESCRIPTION

Figure 5:
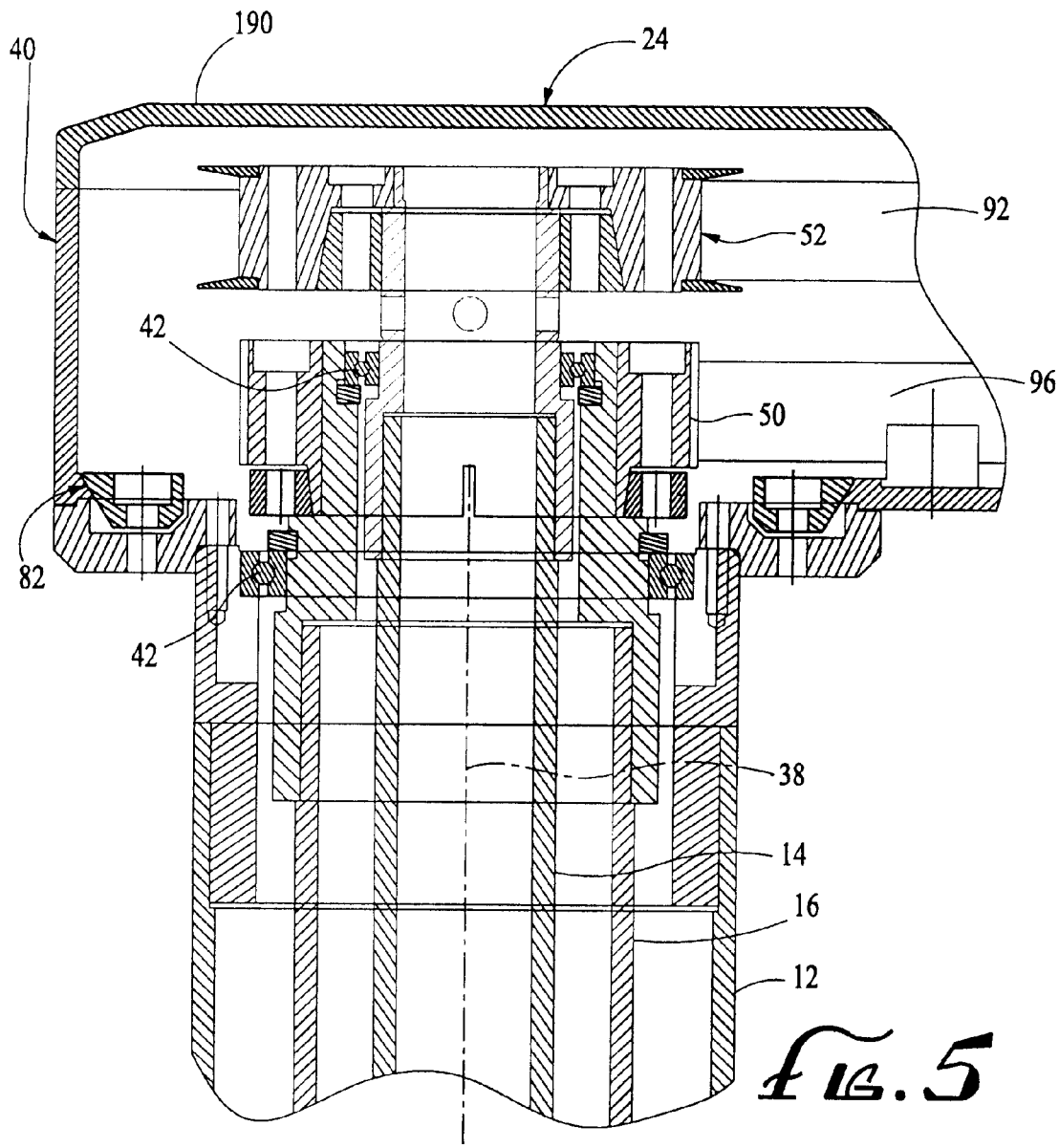
FIG. 5 is an enlarged cutaway view of the spindle assembly with a portion of the arm housing covering the drive pulleys on the top of the spindles.
Figure 8:
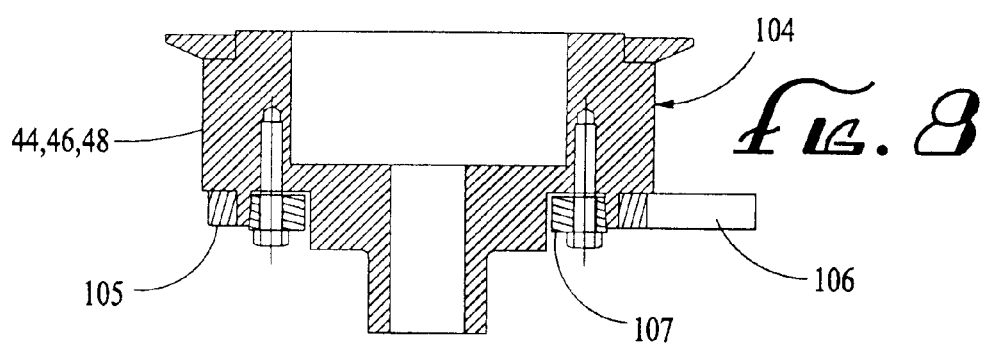
FIG. 8 is a cutaway view of the tab ring sub assembly.

Referring to FIG. 1, the robot drive assembly 10, comprises a set of concentrically nested spindles 12, 14, 16 the lower portion of which is mounted in a body (the z-body) 18. The lower surface of the z-body is a motor mount flange 20 into which the drive motor assemblies 22 are placed and secured. The motor assemblies 22 drive the spindles 12, 14, 16, as described below. Referring to FIGS. 6 and 7, a robot arm 24 comprises a lower arm or aftarm 26 and a forearm 28 with movable elbow joint 30 and wrist joint 32. The robot arm 24 is attached to the top of the outer spindle 12. The robot drive assembly 10 is placed in the half shell frame assembly 34, which includes means for raising and lowering the assembly 10 and mounting the assembly 10 to a table or platform 36.

FIG. 1 shows the spindle and drive assembly. The spindles 12, 14, 16, comprising hollow tubes, are concentrically placed about a central axis 38 such that each spindle 12, 14, 16 can be independently rotated around said central axis 38. A first spindle, designated the shoulder spindle 12, provides controlled rotary movement to the robot arm 24 at the shoulder end 40 of the lower or aftarm 26. A second spindle, designated the elbow spindle 14, provides controlled rotary movement to the robot forearm 38 at the elbow 30 of the robot arm 24, the elbow 30 being at the junction of the lower arm 26 and the forearm 28. A third spindle, designated the wrist spindle 16, provides controlled rotary movement to the wrist joint 32 of the robot arm 24, the wrist 32 being at the distal end of the forearm 28.

The portion of the nested spindles 12, 14, 16 near there lower end are surrounded by a z-body 18, with its motor mount flange 20. While the spindles are free to rotate around the central axis, they are mechanically constrained by the z-body 18 and bearings 42 so that they are not free to telescope in relationship to each other. Independent rotational motion of the spindles 12, 14, 16 is made possible by bearing rings (ball bearing or roller bearings) 42 attached at the top and bottom between each of the spindle pairs. Bearings 42 are also present at the top and bottom of the z-body in contact with the outer wall of the shoulder spindle 12.

Attached to the bottom of each spindle 12, 14, 16 is a pulley for receiving a drive belt, the drive belt transmitting rotational motion to the pulley, and in turn to the spindle, the rotational motion being generated by several individual drive motors 22, one for each spindle. Also, attached to the top of the elbow and wrist spindle 14, 16 are pulleys for transmitting the rotational movement of each spindle to the appropriate portion of the robot arm 24. More specifically, mounted on the bottom of the shoulder spindle 12 is a lower shoulder pulley 44, mounted on the bottom of the elbow spindle 14 is a lower elbow pulley 48 and mounted on the bottom of the wrist spindle 16 is a lower wrist pulley 46. Likewise, mounted on the top of the of the elbow spindle 14 is an upper elbow pulley 52 and mounted on the top of the wrist spindle 16 is an upper wrist pulley 50.

FIG. 2 is a top view of the z body motor mount 20 taken along line 2—2 of FIG. 1. Motor mount flange is substantially flat with four frame cutouts or openings 54 for receiving and retaining the three drive motors 22 and the z travel motor 182. In particular, the unique detail 60 of the mating surfaces in each of four cutouts 54 in the z-body 18, and the motor assembly mounting annular ring or mounting extension 56 on each motor assembly 22, 182 holds the motor assembly's central axis parallel to the spindle axis 38 regardless of the belt tension, even with the mounting cleat 68 loose. This feature permits belt tensioning with the cleat 68 loose. The belt tension setting remains at the same value when the cleat is locked into place. As shown in FIG. 2, FIG. 3 and FIG. 16, the motor assembly mounting annular ring, also referred to as positioning collar 56, has two features, a quarter toroidal top, and a flat surface perpendicular to the motor axis on the bottom which rest in mounting grooves 60 in the vertical wall surface of the non-circular openings 54. The cleat 68 is secured against the positioning collar 56, locking the drive motors 22, 182 in desired positions. The arrangement of the motor shaft 62 off center in the positioning collar 56 provides the operator the opportunity to loosen the cleat 68 and rotate the positioning collar in the non-circular opening 54, thus moving the motor shaft, and the pulley attached thereto, so that the belt connecting the motor pulley to the spindle pulley or Z-drive can be readily tensioned. Resecuring the cleat 68 in position then locks the motor with the shaft in the new desired location to properly tension the drive belt on the respective pulley. A critical feature of the geometry described above is that lessening the cleat 68 to tension a belt by rotating the motor assembly maintains the axis of the motor assembly. Therefore the motor axis stays parallel to the spindle axis allowing the belt to run true on its pulleys and the reset tension in the belt is not altered by subsequently tightening the cleat 68. This feature is further facilitated by the shape of the cleat 68 and the way it is attached to the z-body. The cleat 68 is restrained by one of its mounting surfaces and a tab on the opposite end of the cleat 68 that is in intimate contact with the z-body. With the bolts loosened on the cleat 68, it is not permitted to move except to rotate about a pin parallel to the motor axis.

With reference to FIGS. 1, 3 and 28 it can be seen that three identical drive motor assemblies 22 with their mounting collars 56 can be provided for constructing the assembly.

It should be noted that FIG. 2 shows only one drive motor installed. However, one will recognize that three drive motors 22 are required to drive the three spindles. In addition, a Z-drive motor assembly 182 is shown. This is possible because the positioning collar 56, in the embodiment shown, is repeated three times on the motor assembly located so that use of the proper mounting ring 56 positions the motor pulley in line with the appropriate spindle pulley 44, 46, 48, FIG. 1 shows the drive motor assembly 22 mounted using the lower mounting extension 56 so the motor pulley 66 is aligned with the shoulder pulley. FIG. 1 also shows a drive belt 80 connecting the motor pulley 66 and lower shoulder pulley 44. FIG. 3 shows the middle mounting extension 56 held between the motor mounting grooves 60 and the cleat 68, which is the arrangement for driving the wrist spindle 16. If the upper mounting extension 56 were held between the mounting frame 20 and the cleat 68 then the drive motor 22 would be aligned for driving the elbow spindle 14.

The preferred drive motor 23 incorporates a harmonic drive gear reduction to provide the desired rotational speed. More specifically a preferred drive motor 23 is a servomotor with an absolute digital encoder attached to the motor shaft 62, the motor being available from numerous different suppliers. These drive motors 23 are in turn connected to motor controllers operating by a computer based control system.

FIGS. 14 and 15 show the base frame assembly 34 consisting of a flange 78 and the half shell 70 brazed into a single ridged assembly 34. Two bearing rails 72 are attached rigidly to the base frame assembly 34. Riding vertically on the bearing rails 72 are three carriages, or rail hangers 74 one on the first rail and two on the second rail. These three carriages 74 are attached rigidly to the robot drive assembly 10 and facilitates the robot drive assemblies' vertical movement.

The Z lift motor assembly 182 shown in FIGS. 16 and 29 drives the robot drive assembly 10 in the vertical direction. Referring to FIGS. 17–22, the Z-drive motor 184, through pulley 66 and an attached drive belt (not shown), causes a nut 186 that is mounted on a fixed vertical screw 188 to rotate and in turn cause the robot drive assembly 10 to raise vertically along the rail 72. The z motion is further facilitated by a fixed gimbal (not shown) attached to the top of the vertical lead screw 188, and a lower gimbal 192 shown in perspective and cutaway view in FIGS. 17, 18 and 19 between the z drive pully 194, shown in three views in FIGS. 20–22, and the nut 186. The bottom end of the lead screw 188 is unsupported. This unique configuration permits smooth and non-binding operation of the vertical lift with misalignment of the vertical rails 72 and the lead screw 188. This non-critical alignment feature permits loose tolerances in a host of features in various parts within the robot, and eliminates the need for precise alignment of the lead screw during assembly of the robot, Also shown in FIGS. 14 and 15 is a top flange 78 used to mount the whole assembly to a table top or platform.

Figure 27:
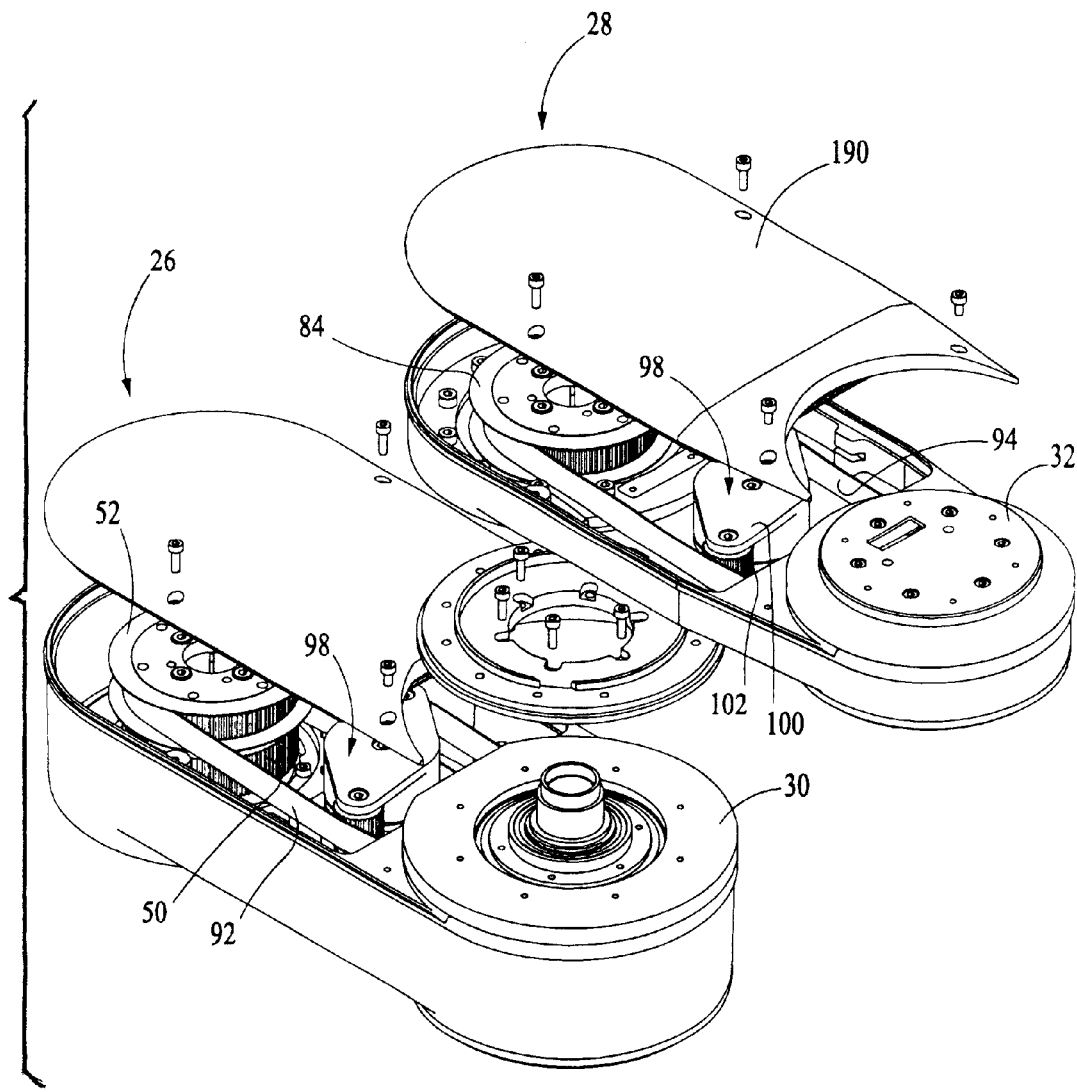
FIG. 27 is a top perspective view of the forearm and aftarm with the top covers removed to show the assembled internal components.

The robot arm 24, as shown in FIGS. 5–7 and 23–27, is attached to the top of the shoulder spindle 12 by bolts placed through clamping ring 82 into the arm base on the shoulder spindle 12. This clamping configuration allows total freedom in orienting the robot arm 24 in any orientation relative to the spindle 12. When the screws are tightened, the arm 24 holds rigidly to the outer (shoulder) spindle 12. When clamped, rotation of the shoulder spindle 12 causes the robot arm to also rotate in a plane perpendicular to the central axis 38 of the spindles. The shoulder end of the robot arm 24 serves as a protective cover over the upper wrist and upper elbow pulleys 50, 52 and drive belts 92, 96 attached thereto. The upper elbow pulley 52 is shown at the left end of FIGS. 6 and 26. However, the upper wrist pulley 50, which is directly below the upper elbow pulley 52, and of substantially the same outer diameter, can not be seen in FIG. 6. The upper elbow/wrist pulley 84 is shown in FIG. 6 and both the upper elbow/wrist pulley 84, the lower elbow/wrist pulley 86 and the wrist pulley 90 are shown in FIGS. 7 and 24. The upper elbow/wrist pulley 84 and the lower elbow/wrist pulley 86 are operatively connected so that rotation of one of said pulleys causes the other pulley to rotate a similar or proportionate amount. The assembled robot arm 24 with top 190 removed is best shown in FIG. 27.

The wrist joint pulley 90 appears on the right hand side of both FIGS. 6 and 7 and in FIG. 24. A first wrist drive belt 96 connects the upper wrist pulley 50 to the lower elbow/wrist pulley 86 and a second wrist drive belt 94 connects the upper elbow/wrist pulley 84 to the wrist joint pulley 90. As a result, rotation of the wrist spindle 16 by drive motor 22 connected thereto is transmitted through the first wrist belt 96 and second wrist belt 94 causing an operating tool (not shown), such as an end effector, attached to wrist joint pulley 90 to also be swiveled in a controlled manner and in a plane perpendicular to the central axis 38 of the spindles.

As shown in FIGS. 5, 7 and 26 an elbow belt 92 is mounted on both the upper elbow pulley 52 and the elbow joint pulley 88. In a like manner, rotation of the elbow spindle 14 by drive motor 22 connected thereto is transmitted through the elbow belt 92 causing the forearm 28 to be swiveled in a controlled manner in a plane perpendicular to the central axis 38 of the spindles.

Prior art devices exhibit long term drift problems caused by belt creep. Their belts are typically tensioned by a single roller applied to an outer surface of the belt at a location midway between drive pulleys, pushing the belt toward the center line between the drive pulleys. This places uneven forces on the belt causing the belts to stretch unevenly, resulting in unwanted rotation of the effected part. In contrast, the present system uses belt tensioner assemblies 98, comprising a tensioner frame 100 with a pair of rollers 102 mounted at the ends of the tensioner frame. The tensioner frames 100 are pivotally mounted on the center line between the respective pulleys with both rollers 102 contacting opposite inner surfaces of the belt. Rotating the belt tensioner 98 around its central mount causes the rollers 102 to tension the belt in an outward direction, providing less stress on the belt structure and evenly balanced belt strain yielding stable arm positioning. FIGS. 6, 24, 26 and 27 show three belt tensioner assemblies 98, a first belt tensioner tightening assembly 98 tightening the first wrist belt 96, a second belt tensioner assembly 98 tightening the second wrist belt 94 and a third belt tensioner tightening the forearm drive belt 92.

Prior art devices that limit the rotational travel of the arms typically are limited to rotations less than 360 degrees. This restriction leaves a spot in the robot's arm travel that can not be reached (a blind spot). Described below is a method used in the present invention to create hard stops that allow more than one revolution of each element of the robot arm. FIGS. 8–12 show a tab ring pully subassembly 104 that mounts to the drive motor shaft and serves to receive a drive belt. As the shaft in the motor rotates the motor tab 106 travels a circular path. There is a similar tab mounted on the lower pulley on each of the spindles (the spindle tab 108). The motor tab 106 extends from a tab ring 105 bolted to the pulley 44, 46, 48 after it is rotated to a desired position on the pully. A tapered compress ring 107 is placed inside the tab ring. Tightening the mounting bolt causes a locking fit to the tab ring 105. This combination of a motor tab 106 and a spindle tab 108 on each paired drive and spindle cooperate to establish a hard stop on the rotation of that particular spindle to prevent the robot aft arm, forearm, or wrist from inadvertently rotating too far and damaging internal plumbing and/or cabling inside the robot. As typically configured, because of gear ratios (or different pulley sizes) on the motor shaft and spindle the motor shaft will rotate three times while a spindle will rotate twice. The tab ring assembly 104 allows the motor tab 106 to be readily adjusted and then locked into place. This adjustment facilitates even contact between tabs.

The movement of the tabs is explained by reference to FIGS. 9–12 which show a 3/2 motor pulley to spindle pulley ratio. While this arrangement applies to each motor assembly 22, for illustration purposes the motor drive assembly 22, shown in FIG. 1, driving the shoulder spindle 12 is shown.

Figure 9:
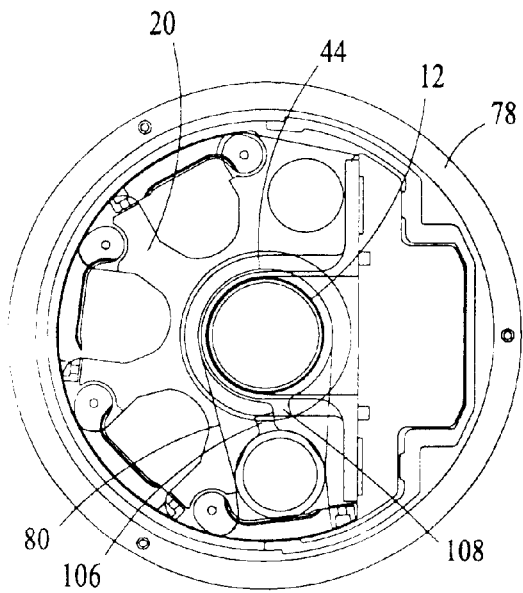
FIGS. 9, 10, 11 and 12 show four different rotational positions of rings with tab extensions mounted on the shaft of a drive motor and a spindle to facilitate the hard stop arrangement.
Figure 10:
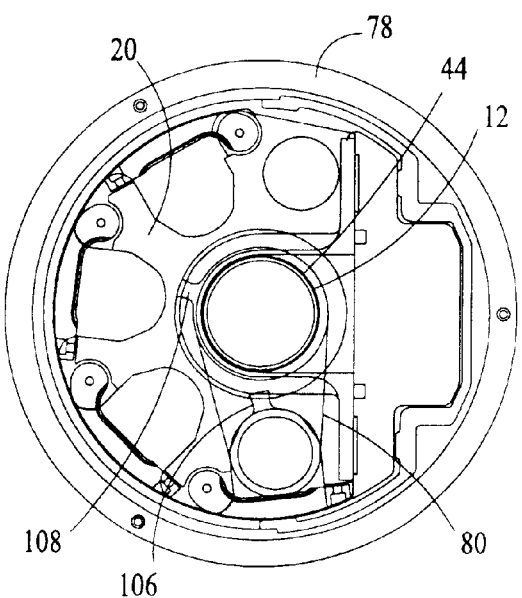
Figure 11:
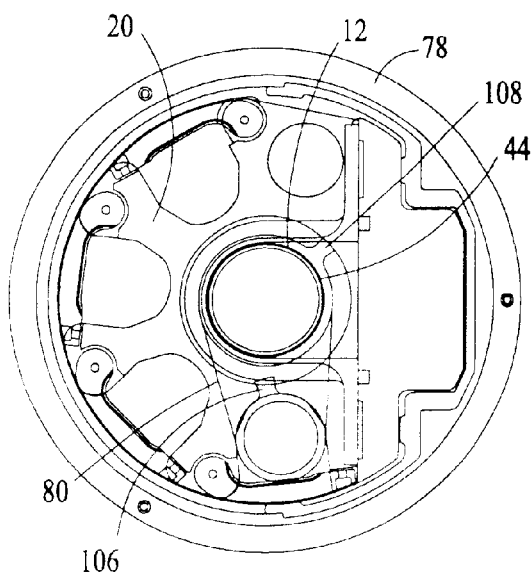
Figure 12:
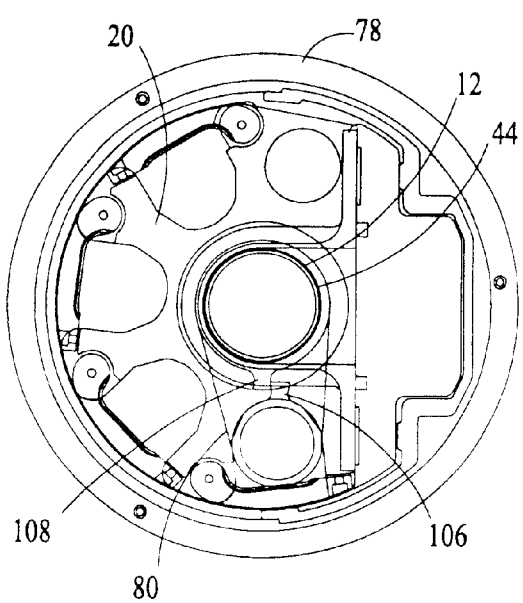
Figure 17:
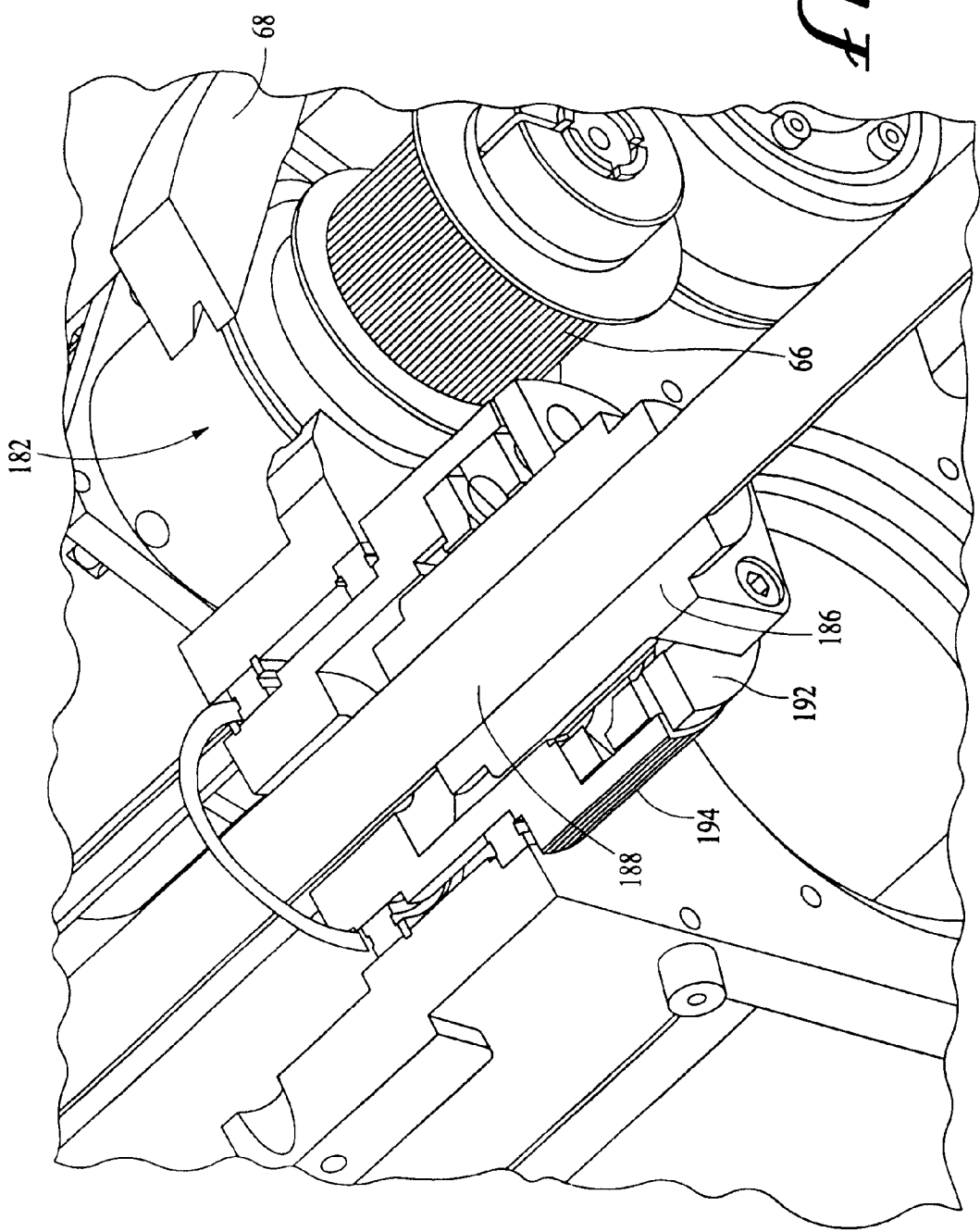
FIG. 17 is a front view of the nut, pulley and gimble, which cooperates with the screw to raise and lower the Z-body.
Figure 18:
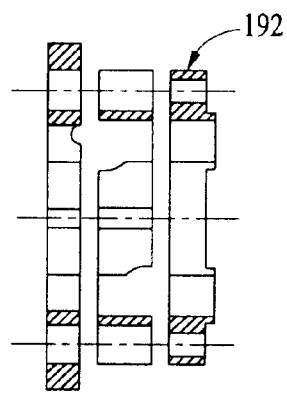
FIGS. 18 and 19 are side and top perspective views respectively of the gimble of FIG. 17.
Figure 19:
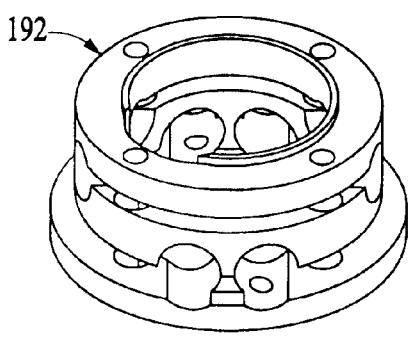
Figure 21:
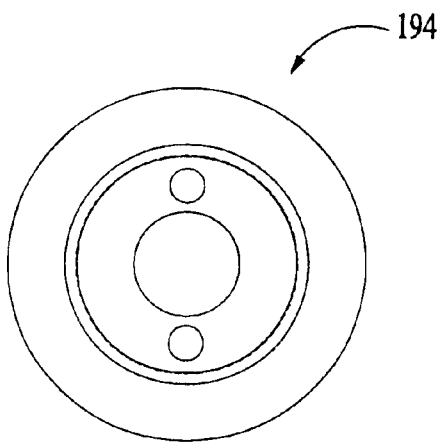
FIGS. 20, 21 and 22 are side, top and bottom views respectively of the Z-pulley.
Figure 22:
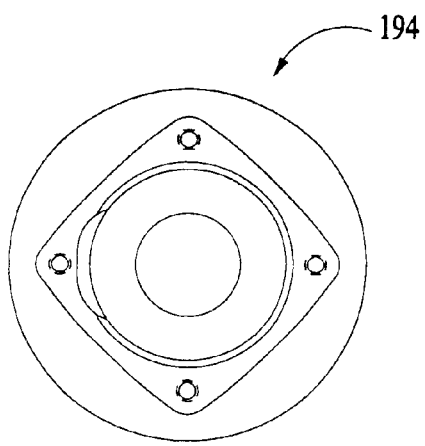
Figure 20:
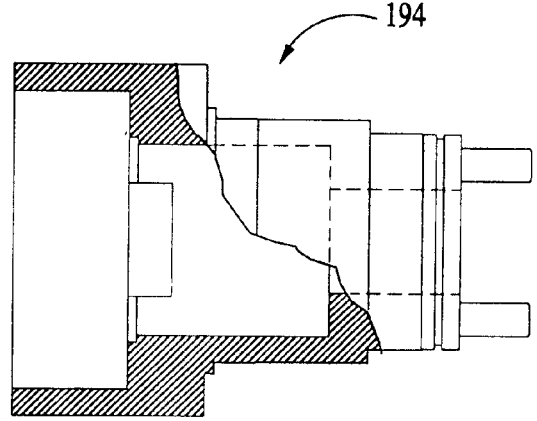

FIG. 9 shows the tabs 106, 108 in contact at one extreme of the rotation of a spindle. In FIG. 10 the motor shaft has made one full rotation while the spindle has rotated 240°. FIG. 11 shows the motor tab after 2 full rotations and a spindle rotation of 480° (1⅓ turns). FIG. 12 shows the tabs in a hard stop position after the motor rotates almost 3 turns and the spindle rotates almost 2 full turns. By changing the gear (pulley) ratio and/or adding additional tabs 106, 108 to the motor and/or spindle and/or changing the tab widths any degree of rotation between hard stops can be selected. This arrangement facilitates the ability to control the degree of rotation of the components of the robot arm. For example, referring to FIG. 10, a second tab added to the spindle 120° ahead of the first tab would restrict the spindle to 240° of rotation for one turn of the motor.

While the above assembly can be constructed from various different materials, one skilled in the art can readily choose these materials for the particular ambient environment in which the robot would operate and the various stresses applied to each piece by the design and operation of the assembly. Preferred material of construction is typically aluminum. However, various different materials may be used for operation under various different atmospheric conditions. However, it may be desirable to plate on a protective metal layer or to construct some or all of the components from different materials such as stainless steel for operation in an acid environment, in a vacuum, under extreme temperatures, or in a wet or otherwise hostile environment.

Also, while the above description refers to pulleys and belts, it is contemplated that various different drive train assemblies can be used. For example, the invention contemplates the use of intermeshing gears and gears and drive chains in addition to toothed pulleys or timing belts, as described above.

One skilled in the art will also recognize that the Figures include numerous unlabeled components which are generally used in assembling mechanical devices including frames, mounting brackets, nuts, bolts, washers, spacing, locking or retaining rings, adapters, shims, clamps, bearings, housings, plates, etc. These components are not labeled so as not to unnecessary clutter the drawings with labeling of standard assembly components.

It is evident from the foregoing that there are many additional embodiments of the present invention which, while not expressly described herein, are within the scope of this invention and may suggest themselves to one of ordinary skill in the art. It is therefore intended that the invention be limited solely by the appended claims.

I claim:

1. A robot system for moving a working tool in x, y, z and theta directions, the movement in any of said directions being independent of movement in any of the other directions, comprising:

a jointed, horizontally oriented, moveable arm having forearm and aftarm portions rotationally joined at an elbow joint located there between, said elbow joint providing rotation movement in a horizontal plane, the moveable arm attached to a vertically oriented rotatable first cylinder, rotation of the first cylinder around a central axis being driven by a first drive belt attached to a first drive motor, rotation of said first cylinder causing the moveable arm to rotate in a horizontal plane around said central axis, a vertically oriented rotatable second cylinder coaxially positioned within the first cylinder but rotationally isolated from said first cylinder, rotation of the second cylinder around the central axis being driven by a second drive belt attached to a second drive motor, rotation of said second cylinder causing a wrist joint at the distal end of the forearm, and a tool mounted thereto, to move rotationally in a horizontal plane, a vertically oriented rotatable third cylinder coaxially positioned within the first and second cylinder but rotationally isolated from said second cylinder, rotation of the third cylinder around the central axis being driven by a third drive belt attached to a third drive motor, rotation of said third cylinder causing the forearm to rotate about the elbow joint in a horizontal plane, a motor mounting frame attached to the first cylinder at the first cylinders lower end, in a plane perpendicular to the central axis, with the first cylinder being free to rotate within said motor mounting frame, the first, second and third drive motor being secured in the motor mounting frame, the motor mounting frame being moveably attached to vertically oriented rails such that the motor frame, the first cylinder, along with the second and third cylinders coaxially located therein, and motors attached thereto can ride vertically along said rails, a fourth drive motor attached to said motor mounting frame and operatively attached to the rails by a fourth drive belt so that operation of the fourth motor causes the motor frame, and the first cylinder, along with the second and third cylinders coaxially located therein, and the motors attached thereto to move in a vertical direction.

2. The robot system of claim 1 wherein a first forearm pulley is mounted to the top end of the third cylinder and drive means connects said first forearm pulley to a second forearm pulley within the elbow joint such that rotation of said third cylinder causes a rotation of the elbow joint, a first wrist pulley is mounted to the top end of the second cylinder and drive means connects said first wrist pulley to a second wrist pulley within the elbow joint, a third wrist pulley within the elbow joint is operatively connected to the second wrist pulley, and drive means connects said the third wrist pulley to a fourth wrist pulley located in the distal end of the arm such that rotation of said second cylinder causes a rotation of the wrist joint.

3. The robot system of claim 2 wherein the drive means are three belts forming three continuous 360° loops, the first belt connecting the first elbow pulley and the second elbow pulley, the second belt connecting the first wrist pulley and the second wrist pulley and the third belt connecting the third wrist pulley and the fourth wrist pulley.

4. The robot system of claim 3 further including a first belt tensioner mounted between the first forearm pulley and the second forearm pulley and inside of the first loop, a second belt tensioner mounted between the first wrist pulley and the second wrist pulley and inside of the second loop and a third belt tensioner mounted between the third wrist pulley and the fourth wrist pulley and inside of the third loop each tensioner rotatable on a pivot so as to press the belt it is associated with outward at two points spaced apart on the loop.

5. The robot system of claim 4 wherein the two spaced points on each of the loops are about 180° apart.

6. The robot system of claim 1 wherein the first, second and third drive motors are each mounted in a separate drive motor assembly, each drive motor assembly having a central axis, the motor having a drive shaft extending therefrom with the axis of the drive shaft being parallel to, but spaced from, the axis of the drive motor assembly, each drive motor assembly mounted in a cutout in the motor mounting frame with the axis of each motor shaft parallel to the central axis of the first cylinder such that rotation of each drive motor assembly in the cutout in the motor mounting frame in which it is mounted increases or decreases the distance between the axis of the motor shaft and the central axis of the first cylinder.

7. The robot system of claim 1 wherein a pulley mounted on each motor shaft has a tab extending therefrom and a pulley mounted on the bottom of each cylinder has a tab extending therefrom, each said motor shaft mounted pulley and cylinder mounted pulley constituting a pulley pair with a belt encircling each pulley pair, the diameter of the motor shaft mounted pulley and cylinder mounted pulley each having a different diameter such that the cylinder mounted pulley rotates more than 360° for each 360° rotation of the motor shaft mounted pulley, the tab on the motor shaft contacting the tab on the cylinder to provide a dead stop on each of the extremes of the more than 360° rotation of the cylinder.

8. The robot system of claim 1 wherein the first, second and third drive motors are each mounted in a separate drive motor assembly, each drive motor assembly having a central axis, the motor having a drive shaft extending there from with the axis of the drive shaft being parallel to, but spaced from, the axis of the drive motor assembly and the central axis of the first cylinder, each drive motor assembly mounted in a cutout in the motor mounting frame and held in place by a separate retractable cleat which reversibly locks the drive motor assembly to the motor mounting frame with the axis of each motor shaft parallel to the central axis of the first cylinder such that retraction of the cleat holding a particular drive motor assembly allows rotation of such drive motor assembly in the cutout in the motor mounting frame in which it is mounted to increase or decrease the distance between the axis of the motor shaft and the central axis of the first cylinder, such rotation being accomplished without changing the parallel relationship between the axis of the drive shaft and the central axis of the first cylinder, and subsequent tightening of the cleat locks the motor assembly in its new position.

* * * * *